United States Patent
Kuzmin et al.

(10) Patent No.: US 11,370,914 B2
(45) Date of Patent: Jun. 28, 2022

(54) METHODS OF FORMING POLYMERIC POLARIZERS FROM LYOTROPIC LIQUID CRYSTALS AND POLYMERIC POLARIZERS FORMED THEREBY

(71) Applicant: LIGHT POLYMERS HOLDING, Grand Cayman (KY)

(72) Inventors: Valeriy Kuzmin, San Bruno, CA (US); Evgeny Morozov, Burlingame, CA (US)

(73) Assignee: Light Polymers Holding, George Town (KY)

( * ) Notice: Subject to any disclaimer, the term of this patent is extended or adjusted under 35 U.S.C. 154(b) by 0 days.

(21) Appl. No.: 16/519,423

(22) Filed: Jul. 23, 2019

(65) Prior Publication Data
US 2020/0032058 A1 Jan. 30, 2020

Related U.S. Application Data
(60) Provisional application No. 62/702,767, filed on Jul. 24, 2018.

(51) Int. Cl.
*C08L 77/10* (2006.01)
*G02F 1/13363* (2006.01)
(Continued)

(52) U.S. Cl.
CPC .......... *C08L 77/10* (2013.01); *G02F 1/13363* (2013.01); *G02F 1/133528* (2013.01);
(Continued)

(58) Field of Classification Search
CPC . B05D 5/06; B32B 2457/20; B32B 2457/206; B32B 2457/208; C08G 69/32;
(Continued)

(56) References Cited

U.S. PATENT DOCUMENTS

| 3,208,814 A | 9/1965 | Sievenpiper et al. |
| 4,278,578 A | 7/1981 | Carpenter |

(Continued)

FOREIGN PATENT DOCUMENTS

| EP | 0489951 | 6/1992 |
| JP | 06235917 | 8/1994 |

(Continued)

OTHER PUBLICATIONS

Gribkova "Chemical synthesis of polyaniline in the presence of poly(amidosulfonic acids) with different rigidity of the polymer chain," Apr. 2011, *Polymer* 52(12):2474-2484.

(Continued)

*Primary Examiner* — Eli D. Strah
(74) *Attorney, Agent, or Firm* — Mueting Raasch Group

(57) ABSTRACT

A polymeric lyotropic liquid crystal solution comprises a birefringent aromatic polymer. A linear polarizer layer is obtained by shear-coating the polymeric lyotropic liquid crystal solution on a coatable substrate, and treating the resulting coating layer with a doping-passivation solution containing iodine and multi-valent cations. A linear polarizer includes a birefringent coating layer of 1.0 micrometers or less in thickness, and contains birefringent aromatic polymer, iodine anions, and multi-valent cations. An optical article includes an optical retarder layer of 1.0 micrometers or less in thickness and a linear polarizer layer of 1.0 micrometers or less in thickness, with an intermediate layer between the linear polarizer layer and the optical retarder layer. The optical retarder layer contains a first birefringent aromatic polymer generally aligned along a first alignment direction and the linear polarizer layer contains a second birefringent aromatic polymer generally aligned along a second alignment direction, with an angle between the first (Continued)

alignment direction and the second alignment direction in a range of 40° to 50°.

18 Claims, 10 Drawing Sheets

(51) Int. Cl.
  *G02F 1/1335* (2006.01)
  *B05D 5/06* (2006.01)
  *G02B 5/30* (2006.01)

(52) U.S. Cl.
  CPC ............ *B05D 5/06* (2013.01); *B32B 2457/20* (2013.01); *B32B 2457/206* (2013.01); *B32B 2457/208* (2013.01); *C08L 2203/20* (2013.01); *C09K 2323/00* (2020.08); *C09K 2323/03* (2020.08); *C09K 2323/031* (2020.08); *G02B 5/30* (2013.01); *G02B 5/3025* (2013.01)

(58) Field of Classification Search
  CPC ..... C08G 69/42; C08L 77/10; C08L 2203/20; C09D 177/10; C09K 2323/00; C09K 2323/03; C09K 2323/031; G02B 5/30; G02B 5/3016; G02B 5/3025; G02B 5/3083; G02F 1/133528; G02F 1/13363
  See application file for complete search history.

(56) References Cited

U.S. PATENT DOCUMENTS

| | | |
|---|---|---|
| 4,605,698 A | 8/1986 | Briden |
| 5,067,797 A | 11/1991 | Yokokura et al. |
| 5,739,296 A | 4/1998 | Gvon et al. |
| 5,863,113 A | 1/1999 | Oe et al. |
| 6,002,829 A | 12/1999 | Winston et al. |
| 6,045,894 A | 4/2000 | Jonza et al. |
| 6,049,428 A | 4/2000 | Khan et al. |
| 6,144,424 A | 11/2000 | Okuda et al. |
| 6,174,394 B1 | 1/2001 | Gvon et al. |
| 6,322,236 B1 | 11/2001 | Campbell et al. |
| 6,399,166 B1 | 6/2002 | Khan et al. |
| 6,481,864 B2 | 11/2002 | Hosseini et al. |
| 6,563,640 B1 | 5/2003 | Ignatov et al. |
| 6,583,284 B1 | 6/2003 | Sidorenko et al. |
| 6,619,553 B1 | 9/2003 | Bobrov et al. |
| 6,734,936 B1 | 5/2004 | Schadt et al. |
| 6,841,320 B2 | 1/2005 | Lazarev et al. |
| 6,846,522 B1 | 1/2005 | Bobrov et al. |
| 6,847,420 B2 | 1/2005 | Lazarev et al. |
| 6,848,897 B2 | 2/2005 | Lazarev et al. |
| 6,876,806 B2 | 4/2005 | Lazarev et al. |
| 6,913,783 B2 | 7/2005 | Lazarev et al. |
| 6,942,925 B1 | 9/2005 | Lazarev et al. |
| 6,962,734 B2 | 11/2005 | Nazarov et al. |
| 7,015,990 B2 | 3/2006 | Yeh et al. |
| 7,025,900 B2 | 4/2006 | Sidorenko et al. |
| 7,026,019 B2 | 4/2006 | Dutova et al. |
| 7,031,053 B2 | 4/2006 | Bobrov et al. |
| 7,042,612 B2 | 5/2006 | Lazarev et al. |
| 7,045,177 B2 | 5/2006 | Dutova et al. |
| 7,053,970 B2 | 5/2006 | Lazarev |
| 7,084,939 B2 | 8/2006 | Paukshto et al. |
| 7,092,163 B2 | 8/2006 | Bastawros et al. |
| 7,106,398 B2 | 9/2006 | Bobrov |
| 7,108,749 B2 | 9/2006 | Bobrov |
| 7,110,177 B2 | 9/2006 | Sugino et al. |
| 7,113,337 B2 | 9/2006 | Lazarev et al. |
| 7,132,138 B2 | 11/2006 | Lazarev |
| 7,144,608 B2 | 12/2006 | Paukshto et al. |
| 7,160,485 B2 | 1/2007 | Nazarov et al. |
| 7,166,161 B2 | 1/2007 | Lazarev et al. |
| 7,190,416 B2 | 3/2007 | Paukshto et al. |
| 7,204,938 B2 | 4/2007 | Lazarev |
| 7,211,824 B2 | 5/2007 | Lazarev |
| 7,267,849 B2 | 9/2007 | Lazarev et al. |
| 7,271,863 B2 | 9/2007 | Paukshto et al. |
| 7,291,223 B2 | 11/2007 | Lazarev |
| 7,297,209 B2 | 11/2007 | Lazarev et al. |
| 7,315,338 B2 | 1/2008 | Yeh et al. |
| 7,317,499 B2 | 1/2008 | Paukshto et al. |
| 7,324,181 B2 | 1/2008 | Lazarev et al. |
| 7,405,787 B2 | 7/2008 | Paukshto et al. |
| 7,450,194 B2 | 11/2008 | Lazarev |
| 7,456,915 B2 | 11/2008 | Lazarev et al. |
| 7,479,311 B2 | 1/2009 | Bobrov |
| 7,480,021 B2 | 1/2009 | Rao et al. |
| 7,554,636 B2 | 6/2009 | Nakatsugawa |
| 7,557,876 B2 | 7/2009 | Lazarev et al. |
| 7,651,738 B2 | 1/2010 | Grodsky et al. |
| 7,660,047 B1 | 2/2010 | Travis et al. |
| 7,733,443 B2 | 6/2010 | Lazarev et al. |
| 7,850,868 B2 | 12/2010 | Matsuda et al. |
| 7,888,505 B2 | 2/2011 | Doutova et al. |
| 7,889,297 B2 | 2/2011 | Palto |
| 7,911,557 B2 | 3/2011 | Lazarev et al. |
| 7,969,531 B1 | 6/2011 | Li et al. |
| 8,081,270 B2 | 12/2011 | Lazarev |
| 8,142,863 B2 | 3/2012 | Palto |
| 8,168,082 B2 | 5/2012 | Matsuda et al. |
| 8,189,165 B2 | 5/2012 | Umemoto et al. |
| 8,257,802 B2 | 9/2012 | Inoue et al. |
| 8,268,937 B2 | 9/2012 | Bos et al. |
| 8,305,350 B2 | 11/2012 | Chang |
| 8,404,066 B2 | 3/2013 | Goto et al. |
| 8,416,376 B2 | 4/2013 | Palto |
| 8,512,824 B2 | 8/2013 | Kasianova et al. |
| 8,551,357 B2 | 10/2013 | Miyazaki et al. |
| 2003/0179363 A1 | 9/2003 | Wang |
| 2004/0156105 A1* | 8/2004 | Trapani ................ G02B 5/3083 359/489.03 |
| 2006/0187548 A1* | 8/2006 | Rao ........................ C08J 7/043 359/487.02 |
| 2007/0064417 A1 | 3/2007 | Hatanaka et al. |
| 2007/0110378 A1 | 5/2007 | Zarian |
| 2007/0279934 A1 | 12/2007 | Kim et al. |
| 2007/0285599 A1 | 12/2007 | Oxude |
| 2008/0042154 A1 | 2/2008 | Wano |
| 2008/0074595 A1 | 3/2008 | Nakatsugawa |
| 2008/0298067 A1 | 12/2008 | Chu |
| 2008/0304283 A1 | 12/2008 | Parker et al. |
| 2009/0269591 A1 | 10/2009 | Kasianova et al. |
| 2010/0039705 A1 | 2/2010 | Doutova et al. |
| 2010/0085521 A1 | 4/2010 | Kasianova et al. |
| 2010/0149471 A1 | 6/2010 | Palto |
| 2010/0190015 A1 | 7/2010 | Kasianova |
| 2010/0215954 A1 | 8/2010 | Kuzmin et al. |
| 2011/0149206 A1 | 6/2011 | Lazarev |
| 2011/0149393 A1 | 6/2011 | Nokel et al. |
| 2011/0182084 A1 | 7/2011 | Tomlinson et al. |
| 2011/0255305 A1 | 10/2011 | Chen et al. |
| 2012/0013982 A1 | 1/2012 | Kharatiyan |
| 2012/0081784 A1 | 4/2012 | Lazarev |
| 2012/0099052 A1 | 4/2012 | Lazarev |
| 2012/0113380 A1 | 5/2012 | Geivandov et al. |
| 2012/0113678 A1 | 5/2012 | Cornelissen et al. |
| 2012/0113680 A1 | 5/2012 | Nakai et al. |
| 2012/0244330 A1 | 9/2012 | Sun |
| 2013/0003178 A1 | 1/2013 | Lazarev |
| 2013/0011642 A1 | 1/2013 | Sun |
| 2013/0070480 A1 | 3/2013 | Griffin et al. |
| 2013/0251947 A1 | 9/2013 | Lazarev |
| 2014/0133177 A1 | 5/2014 | Miller et al. |
| 2014/0140091 A1 | 5/2014 | Vasylyev |
| 2014/0186637 A1 | 7/2014 | Kasianova et al. |
| 2014/0320961 A1 | 10/2014 | Lazarev |
| 2014/0322452 A1 | 10/2014 | Kasyanova et al. |
| 2014/0350214 A1 | 11/2014 | Kharatiyan |
| 2015/0086799 A1 | 3/2015 | Kasyanova et al. |
| 2015/0123911 A1 | 5/2015 | Poliakov et al. |

(56) References Cited

U.S. PATENT DOCUMENTS

2015/0266999 A1    9/2015  Kuzmin et al.
2017/0269271 A1*  9/2017  Hatanaka ............. G02B 5/3016

FOREIGN PATENT DOCUMENTS

| JP | 2010-091984 A | 4/2010 |
|----|---|---|
| WO | WO 2010-064194 A1 | 6/2010 |
| WO | WO 2012-007923 A1 | 1/2012 |
| WO | WO 2013-119922 A1 | 8/2013 |
| WO | WO 2014/174381 | 10/2014 |

OTHER PUBLICATIONS

Kasianova, "New Transparent Birefringent Material for Interference Polarizer Fabrication" 2006 *XV International Symposium Advanced Display Technologies (ADT'06)*, Moscow, Russia, 1-6.

Konoshchuk, "Physicochemical Properties of Chemically and Mechanochemically Prepared Interpolymer Complexes of Poly(3,4-Ethylenedioxythiophene) with Polyamidosulfonate Dopants," Jan. 2014, *Theoretical and Experimental Chemistry* 50(1): 21-28 (Russian Original, Jan. 2014).

Koo et al., "Preparation and humidity-sensitive properties of novel photocurable sulfonated polyimides," *Macromolecular Research*, Dec. 1, 2012, 20(12): 1226-1233.

Li, "Design Optimization of Reflective Polarizers for LCD Backlight Recycling" Aug. 2009 *J Display Tech.*, 56(8): 335-340.

* cited by examiner

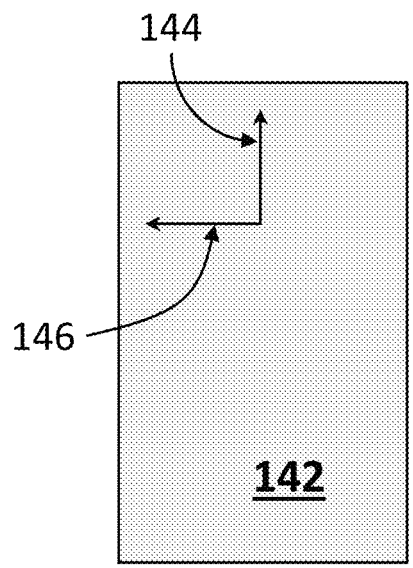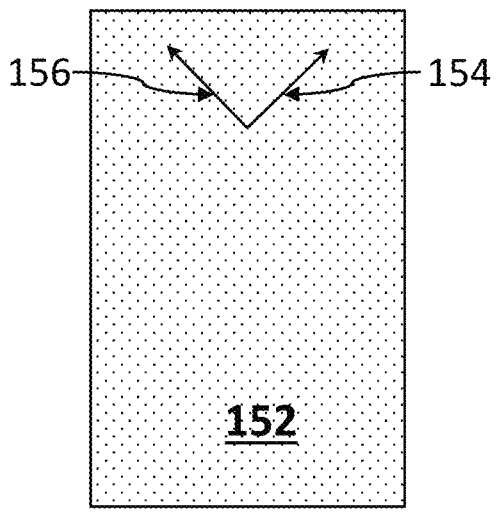
Fig. 13  Fig. 14
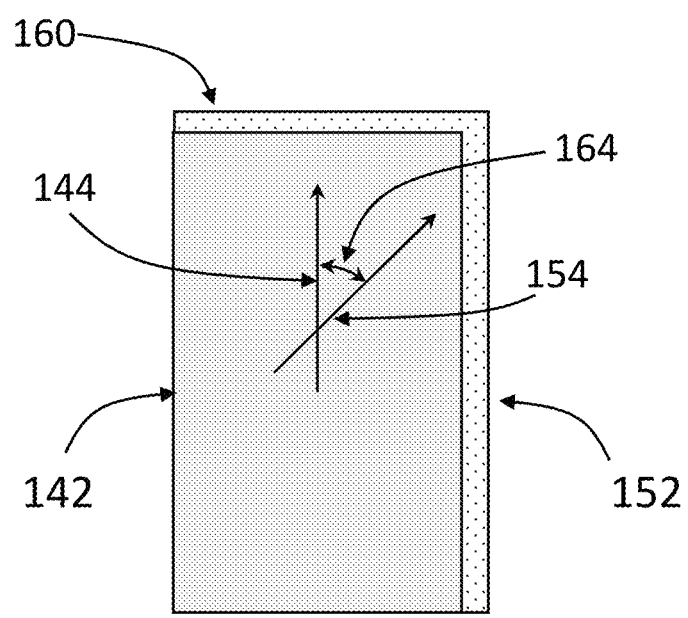
Fig. 15

METHODS OF FORMING POLYMERIC POLARIZERS FROM LYOTROPIC LIQUID CRYSTALS AND POLYMERIC POLARIZERS FORMED THEREBY

CROSS REFERENCE TO RELATED APPLICATIONS

This application claims the benefit of U.S. Provisional Application No. 62/702,767, filed Jul. 24, 2018, which is incorporated by reference herein.

BACKGROUND

Poly(vinyl alcohol) films are doped with iodine and subsequently stretched uniaxially to obtain dichroic polarizers in which the absorption of visible light is maximum along the stretch direction and minimum perpendicular to the stretch direction. These PVA-iodine polarizers are used widely in liquid crystal displays (LCDs). However, this conventional technology has some limitations. A first limitation is that PVA-iodine polarizer requires stretching. A second limitation is that a typical PVA-iodine polarizer film is 60~80 μm thick.

Therefore, what is desired is a new linear polarizer technology that overcomes these and other limitations.

SUMMARY

In one aspect, a method of forming a linear polarizer includes shear-coating a polymeric lyotropic liquid crystal solution on a substrate to form polymeric birefringent coating layer, and treating the polymeric birefringent coating layer with a doping-passivation solution to form a linear polarizer layer. The polymeric lyotropic liquid crystal solution contains a birefringent aromatic polymer. The polymeric birefringent coating layer is 2.0 micrometers or less in thickness. The doping-passivation solution contains iodine and multi-valent cations.

In another aspect, a linear polarizer includes a polymeric birefringent coating layer. The polymeric birefringent coating layer contains a birefringent aromatic polymer, iodine anions, and multi-valent cations. The polymeric birefringent coating layer is 2.0 micrometers or less in thickness. The polymeric birefringent coating layer is substantially free of poly(vinyl alcohol). A circular polarizer can be obtained by combining a quarter-wave retarder and the linear polarizer. The linear polarizer can be incorporated into a display such as a liquid crystal display (LCD). The circular polarizer can be incorporated into a display such as organic light-emitting diode (OLED) display.

In yet another aspect, an optical article includes an optical retarder layer, a linear polarizer layer, and an intermediate layer between the optical retarder and linear polarizer layers to limit ion between the optical retarder and linear polarizer layers. Each of the optical retarder and linear polarizer layers is 1.0 micrometers in thickness or less. The optical retarder layer contains a first birefringent aromatic polymer generally aligned along a first alignment direction. The linear polarizer layer contains a second birefringent aromatic polymer, iodine anions, and multi-valent cations. The second birefringent aromatic polymer is generally aligned along a second alignment direction. An angle between the first alignment direction and the second alignment direction is in a range of 40° to 50° Each of the optical retarder and linear polarizer layers contains a birefringent aromatic polymer. The linear polarizer layer is substantially free of poly(vinyl alcohol).

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which:

FIG. 13 is a schematic top view of an illustrative linear polarizer.

FIG. 14 is a schematic top view of an illustrative retarder.

FIGS. 15 and 16 are schematic top and side views of an illustrative optical article.

DETAILED DESCRIPTION OF ILLUSTRATIVE EMBODIMENTS

Figure 1:
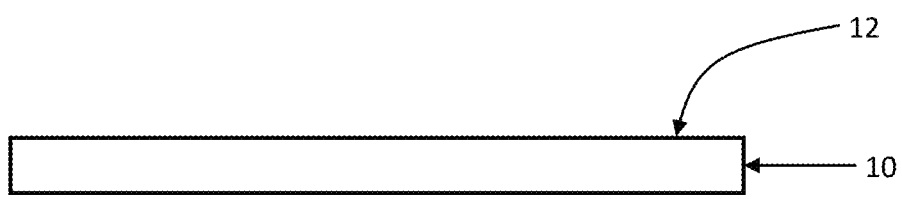
FIG. 1 is a cross-sectional schematic diagram view of an illustrative coatable substrate.

The present disclosure relates to method of forming linear polarizers from birefringent aromatic polymers complexed with iodine. The present disclosure also relates to linear polarizers comprising an iodized polymeric birefringent coating layer. There are generally two methods available to form the iodized polymeric birefringent coating layer. According to the first embodiment, a polymeric birefringent coating layer is formed by shear-coating of a polymeric lyotropic liquid crystal solution, and the polymeric birefringent coating layer is converted into an iodized polymeric birefringent coating layer by staining in an doping-passivation solution. According to the second embodiment, an iodized polymeric birefringent coating layer is formed by shear-coating of an iodized polymeric lyotropic liquid crystal solution.

In this disclosure:

"Aqueous" refers to a material being soluble or dissolved in water at an amount of at least 1 wt. % or at least 5 wt. % of the material in water at 20° C. and 1 atmosphere.

"Visible spectral range" refers to a spectral range between approximately 400 nm and 700 nm.

An optical coating being "substantially non-absorbing" at a certain wavelength means that its transmission of light at that wavelength is 90% or greater regardless of polarization state of the light, the transmission being normalized to the intensity of the light incident on the optical coating.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

Also herein, the recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

In the detailed description below, the substrate used is a cellulose triacetate (TAC) substrate, unless otherwise specified. Coating layers with high polarization efficiencies were demonstrated. Generally, the substrate can be made of various materials, for example, glass, silicon, quartz, sapphire, plastic, and/or a polymer. The substrate can be in various forms, such as a film, a sheet, or a plate. Polymeric substrates can be, for example, cellulose triacetate (TAC); polyethylene terephthalate (PET), poly(methyl methacrylate) (PMMA), polycarbonate (PC), or a cyclic-olefin polymer (COP). The substrate may be pre-treated before coating of the coating liquid to improve adhesion of the coating liquid and coating layer to the substrate. For example, the substrate may be corona treated, saponified, plasma treated, and/or primed with a primer. In some embodiments, the substrate is an optically clear adhesive (OCA) film such as an acrylic OCA film in which the coating liquid is coated on, and the coating layer is formed on, the adhesive layer of the OCA film. In some embodiments, the substrate is an optical element. "Optical element" refers to any element that has an optical function, such as focusing light, diffusing light, polarizing light, recycling light, filtering certain colors of the spectrum, and the like. Examples of optical elements include: prism film, diffuser film, brightness enhancement film, micro-lens film, color-filter array, lens, linear polarizer, circular polarizer, and reflective polarizer.

Various methods of coating the coatable liquid on the substrate are available. The coating method can be a batch process or an in-line process. In a batch process, substrates should be in the form of sheets or plates. Suitable coating methods in a batch process include slit coating, spin coating, and spray coating. In an in-line process, the substrate should be a roll of film. Suitable coating methods in an in-line (roll-to-roll) process include slot-die coating, micro-gravure coating, and comma coating.

Figure 6:
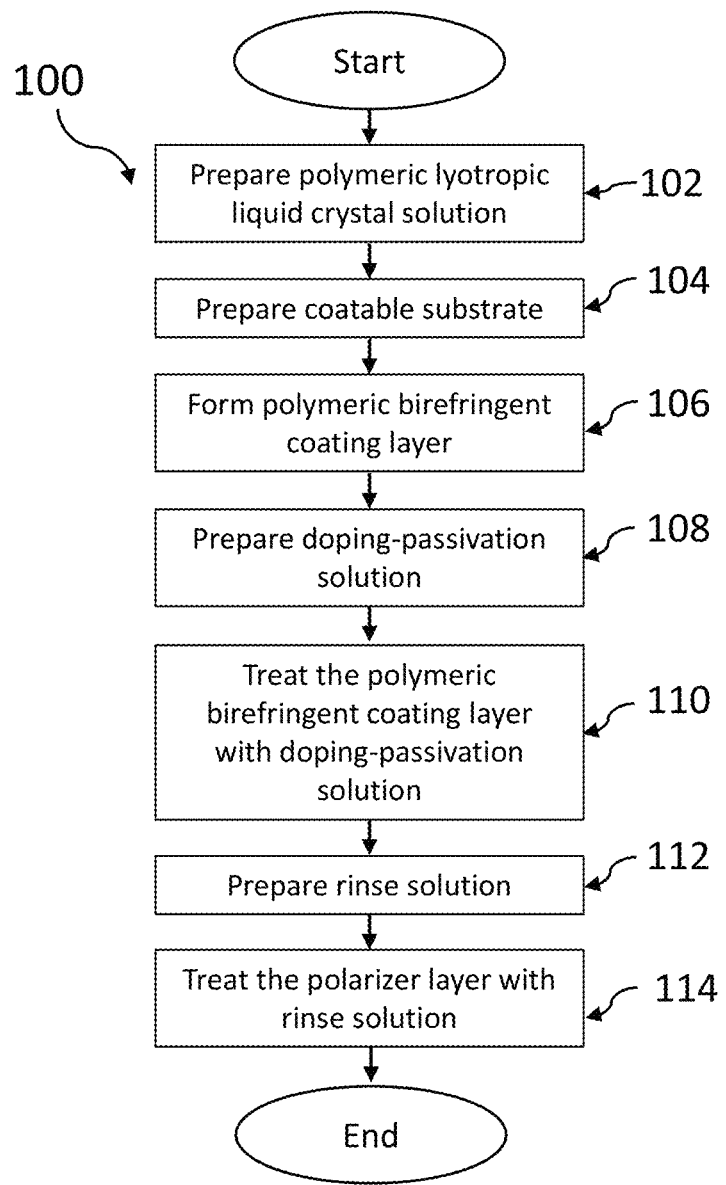
FIG. 6 is a schematic diagram of a method of forming an illustrative linear polarizer according to a first embodiment.

A method 100 of forming an illustrative linear polarizer according to the first embodiment is shown in FIG. 6. At step 102, a polymeric lyotropic liquid crystal solution is prepared. The polymeric lyotropic liquid crystal solution includes an aqueous solution of a birefringent aromatic polymer. Details of the polymeric lyotropic liquid crystal solutions are explained below. At step 104, a coatable substrate is prepared. A coatable substrate 10 is shown schematically in FIG. 1. The coatable substrate 10 includes a coatable surface 12. An example of a coatable substrate is a glass substrate. Another example of a coatable substrate is a TAC film substrate. For example, step 104 may include cleaning the substrate to reduce particles, and/or coating the substrate with a primer.

Figure 2:
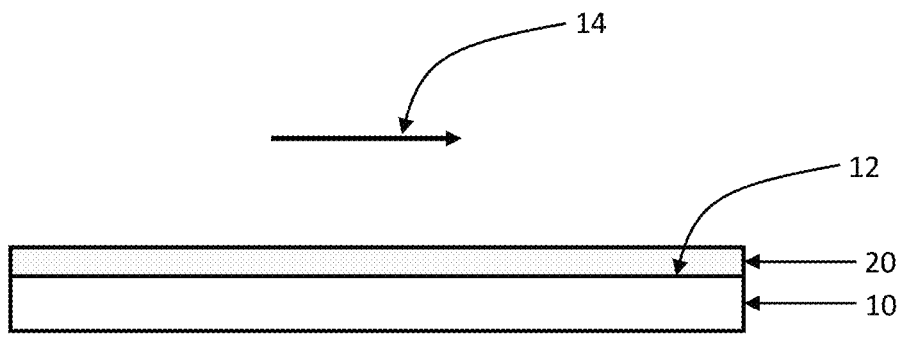
FIG. 2 is a cross-sectional schematic diagram view of an illustrative coatable substrate upon which a polymeric lyotropic liquid crystal solution has been shear-coated, according to a first embodiment.
Figure 3:
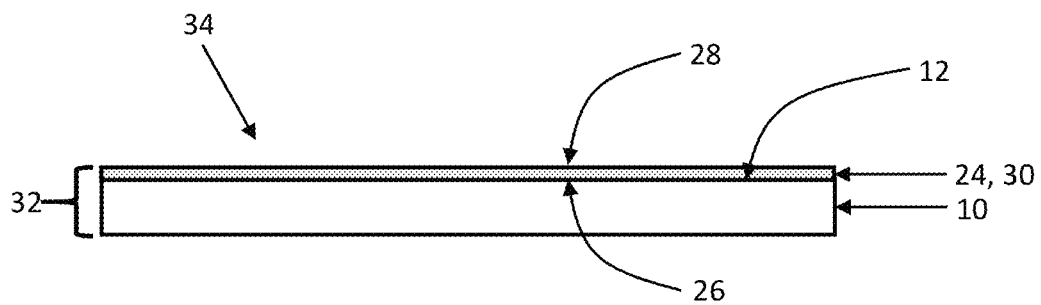
FIG. 3 is a cross-sectional schematic diagram view of an illustrative coated substrate, according to a first embodiment.

With continuing reference to FIG. 6, a polymeric birefringent coating layer is formed on the coatable substrate (step 106). The polymeric lyotropic liquid crystal solution, prepared at step 102, is shear-coated on the coatable surface 12 of the coatable substrate 10. The preparation of the polymeric birefringent coating layer according to the first embodiment is explained with reference to FIGS. 2 and 3. FIG. 2 is a cross-sectional schematic diagram view of the coatable substrate 10 upon which a polymeric lyotropic liquid crystal solution layer 20 has been formed by shear-coating along a shear-coating direction (arrow 14), according to the first embodiment. The step of shear-coating a polymeric lyotropic liquid crystal solution can be done by a suitable process, such as a slit coating process. The polymeric lyotropic liquid crystal solution layer 20 is dried to form a polymeric birefringent coating layer 24 on the coatable substrate 10, as shown schematically in cross-section in FIG. 3. FIG. 3 is a cross-sectional schematic diagram view of a coated substrate 32 according to the first embodiment, which includes the polymeric birefringent coating layer 24 and the coatable substrate 10. The polymeric birefringent coating layer 24 has two major surfaces 26 and 28. Inner major surface 26 is in contact with the coatable surface 12 of the coatable substrate 10. Outer major surface 28 is opposite of coating layer inner major surface 26, and is shown as being exposed in FIG. 3. The polymeric birefringent coating layer is preferably 2.0 micrometers or less in thickness, and more preferably 1.0 micrometers or less in thickness.

Figure 8:
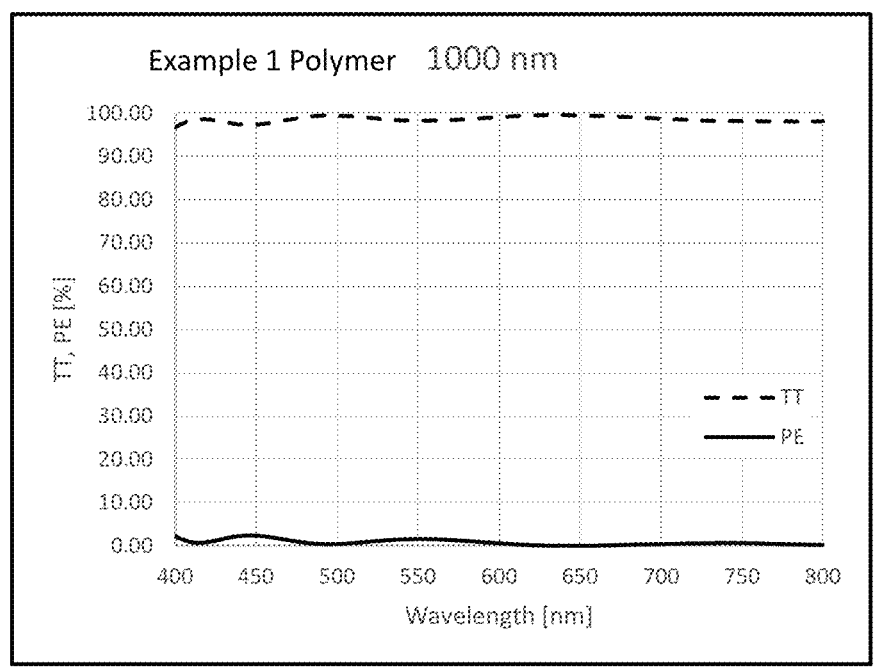
FIG. 8 is a graph of the wavelength dependence of the total transmittance (TT) and polarization efficiency (PE) of a polymeric birefringent coating layer, consisting of a birefringent aromatic polymer of structure (A).

Optical properties of the coated substrate 32 including the polymeric birefringent coating layer 24 and the coatable substrate 10 were measured for an example coated substrate. The Example 1 Polymer lyotropic liquid crystal solution was shear-coated to form a coating layer, approximately 1000 nm thick, on a glass substrate. FIG. 8 is a graph of the wavelength dependence of the total transmittance (TT) and polarization efficiency (PE) of this coating layer. For this coating layer, the total transmission (TT) was at least 90% in the visible spectral range, or in other words the coating layer is substantially non-absorbing in the visible spectral range. The coating layer exhibits polarization efficiencies (PE) of less than 3% in the visible spectral range. The polymeric birefringent coating layers exhibit negligible polarization in the visible spectral range before they are treated with a doping-passivation solution.

With continuing reference to FIG. 6, a doping-passivation solution is prepared (step 108), and then the polymeric birefringent coating layer is treated with the doping-passivation solution (step 110). The doping-passivation solution is a solution containing doping constituents and multi-valent cations. The doping constituents are iodine ($I_2$) and iodide salts and cause the polymeric birefringent coating layer to become doped with iodine anions ($I_3^-$ and $I_5^-$, for example). The doping constituents are dissolved in aqueous solution. Examples of iodide salts are: KI, $NH_4I$, LiI, NaI, CsI, $ZnI_2$, $AlI_3$, and $SrI_2$. These iodide salts, upon dissolution, yield the following cations respectively: $K^+$, $NH_4^+$, $Li^+$, $Na^+$, $Cs^+$, $Zn^{2+}$, $Al^{3+}$, and $Sr^{2+}$. Upon doping with iodine anions, the polymeric birefringent coating layer exhibits polarization. The multi-valent cations render the polymeric birefringent coating layer insoluble in water, by an ion exchange process. In this ion exchange process, monovalent ions of the birefringent aromatic polymers are exchanged for divalent or trivalent cations (multi-valent cations). In this case, examples of multi-valent cations are: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the coating layer would contain one or more of the aforementioned multi-valent cations. In preparing the doping-passivation solution, multi-valent cations are obtained by dissolving certain salts and/or compounds in solution. Some examples of these salts or compounds are: $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$. At step 110, the polymeric birefringent coating layer is treated with the doping-passivation solution. For example, step 110 may include dip-coating the coated substrate 32 in the doping-passivation solution. Alternatively, step 110 may include imprinting, spray coating, ink jet printing, or flexo-printing. The polymeric birefringent coating layer 24, which is was substantially non-absorbing in the visible spectral range, is transformed into a linear polarizer layer 30 having high polarization efficiency in the visible spectral range.

Next, it is preferable to remove excess doping-passivation solution from the linear polarizer layer 30. This can be carried out by spin-drying the coated substrate 32. Alternatively, the coated substrate 32 can be treated with a rinse solution and then dried. This case is illustrated in FIG. 6. A rinse solution is prepared (step 112), and then the doped polymeric birefringent coating layer is treated with the rinse solution (step 114). For example, the rinse solution is a solution of denatured ethanol containing approximately 5% water. For example, step 114 may include submerging the coated substrate 32 in the rinse solution. After rinsing the coated substrate 32 is dried. It has been found that the step of treating the linear polarizer layer with the rinse solution helps to improve the properties of the linear polarizer layer. This completes the steps in forming a linear polarizer 34.

Figure 9:
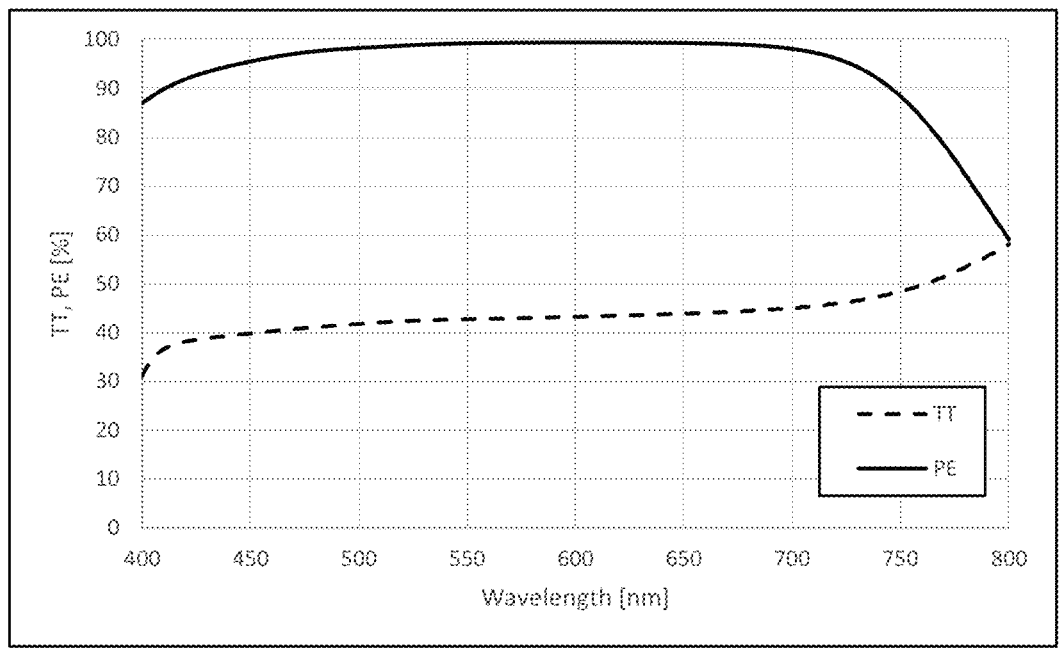
FIG. 9 is a graph of the wavelength dependence of the total transmittance (TT) and polarization efficiency (PE) of a linear polarizer layer, consisting of a birefringent aromatic polymer of structure (A), according to the first embodiment.
Figure 10:
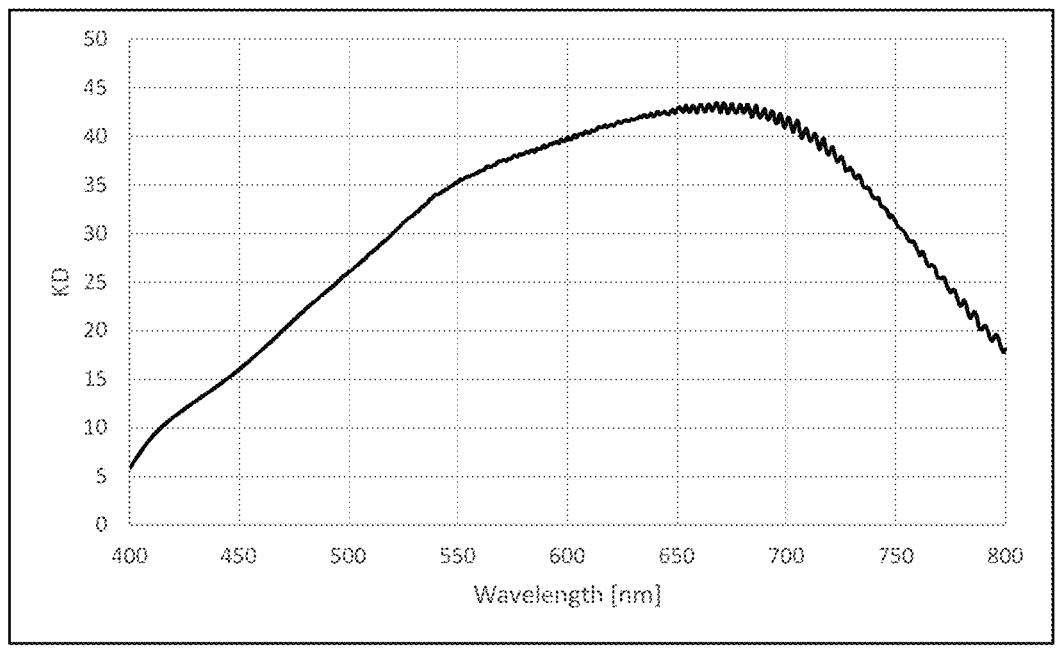
FIG. 10 is a graph of the wavelength dependence of the dichroic ratio (Kd) of a linear polarizer layer, comprising a birefringent aromatic polymer of structure (A), according to the first embodiment.

Optical properties of the linear polarizer layer 30 were measured for a linear polarizer layer according to the first embodiment, formed from a 0.8 μm thick Example 1 Polymer coating and treated with a doping-passivation solution, and rinsed, according to details provided in Example 3 (Example 3 Sample). FIG. 9 is a graph of the wavelength dependence of the total transmittance (TT) and polarization efficiency (PE) of the Example 3 Sample. FIG. 10 is a graph of the wavelength dependence of the dichroic ratio (Kd) of the Example 3 Sample. At 550 nm, TT=42.72%, PE=99.21%, and Kd=35.31. Averaged over the spectral range of 400 nm-700 nm, TT=42.0%, PE=97.6%, and Kd=30.9. The maximum Kd, which occurs around 668 nm, is 43.43.

The quantities TT (total transmittance), PE (polarization efficiency), and Kd (dichroic ratio) are explained with reference to FIG. 13. FIG. 13 is a top schematic view of an illustrative linear polarizer layer 142. A polymeric lyotropic liquid crystal solution which contains a birefringent aromatic polymer has been shear-coated along an in-plane direction 144. As a result of the shear-coating, the birefringent aromatic polymer is generally aligned along direction 144. Direction 144 would be equivalent to direction 14 in FIG. 2. FIG. 13 shows two in-plane directions: direction 144, along which optical absorption would be approximately maximum (transmission approximately minimum), and direction 146, orthogonal to direction 144, along which optical absorption would be approximately minimum (transmission approximately maximum). Linear polarizer transmittance for polarization along direction 144 is referred to as $T_{min}$ and linear polarizer transmittance for polarization along direction 146 is referred to as $T_{max}$. Total transmittance is calculated as $TT=\frac{1}{2}(T_{min}+T_{max})$, polarization efficiency is calculated as $PE=(T_{max}-T_{min})/(T_{max}+T_{min})$, and dichroic ratio is calculated as $Kd=\ln T_{min}/\ln T_{max}$.

Figure 7:
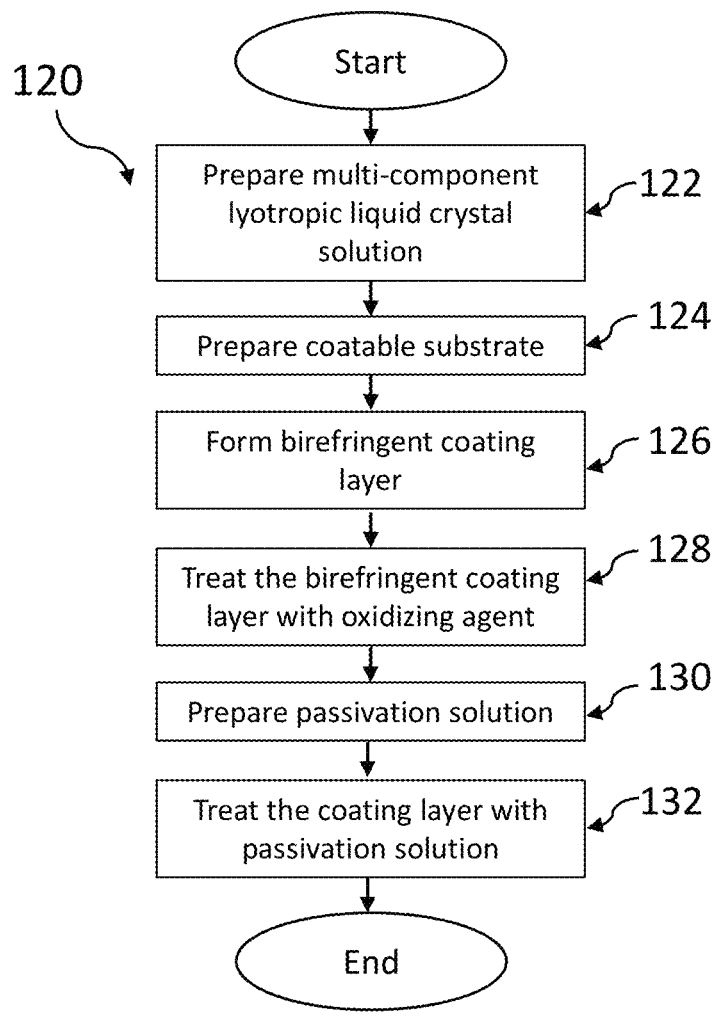
FIG. 7 is a schematic diagram of a method of forming an illustrative linear polarizer according to a second embodiment.

A method 120 of forming an illustrative linear polarizer according to the second embodiment is shown in FIG. 7. At step 122, an multi-component lyotropic liquid crystal solution is prepared. This multi-component lyotropic liquid crystal solution is similar to the polymeric lyotropic liquid crystal solution of the first embodiment (FIG. 6, step 102) in that it includes a birefringent aromatic polymer and water. The multi-component lyotropic liquid crystal solution also includes other components: an iodide salt and carbamide, also called urea. Examples of iodide salts are: KI, $NH_4I$, Lit, NaI, CsI, $ZnI_2$, $AlI_3$, and $SrI_2$. These iodide salts, upon dissolution, yield the following cations respectively: $K^+$, $NH_4^+$, $Li^+$, $Na^+$, $Cs^+$, $Zn^{2+}$, $Al^{3+}$, and $Sr^{2+}$. Details of the multi-component lyotropic liquid crystal solutions are explained below. At step 124, a coatable substrate is prepared. The coatable substrate 10 was explained with reference to FIG. 1.

Figure 4:
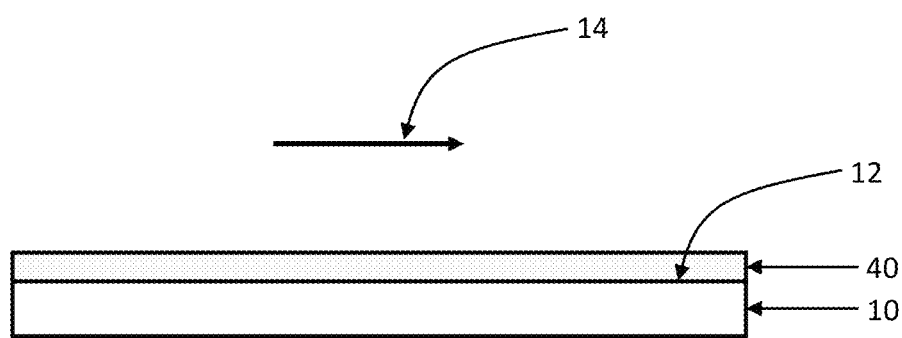
FIG. 4 is a cross-sectional schematic diagram view of an illustrative coatable substrate upon which a multi-component lyotropic liquid crystal solution has been shear-coated, according to a second embodiment.
Figure 5:
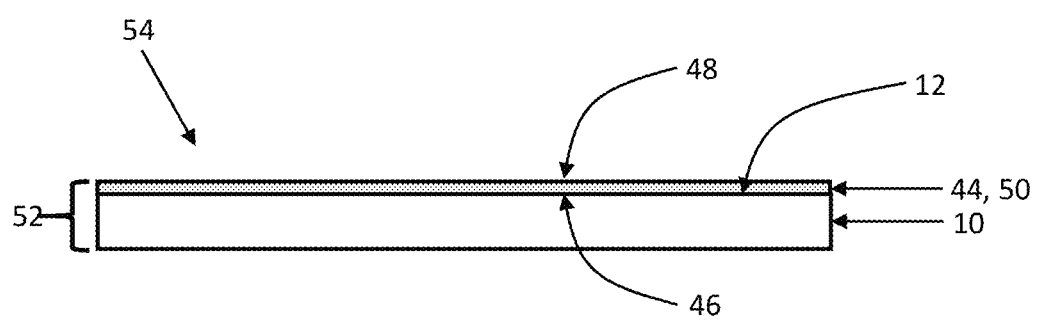
FIG. 5 is a cross-sectional schematic diagram view of an illustrative coated substrate, according to a second embodiment.

With continuing reference to FIG. 7, a birefringent coating layer is formed on the coatable substrate (step 126). The multi-component lyotropic liquid crystal solution, prepared at step 122, is shear-coated on the coatable surface 12 of the coatable substrate 10. The preparation of the birefringent coating layer according to the second embodiment is explained with reference to FIGS. 4 and 5. FIG. 4 is a cross-sectional schematic diagram view of the coatable substrate 10 upon which a multi-component lyotropic liquid crystal solution layer 40 has been formed by shear-coating along a shear-coating direction (arrow 14), according to the second embodiment. The multi-component lyotropic liquid crystal solution layer 40 is dried to form a birefringent coating layer 44 on the coatable substrate 10, as shown schematically in cross-section in FIG. 5. FIG. 5 is a cross-sectional schematic diagram view of a coated substrate 52 according to the second embodiment, which includes the birefringent coating layer 44 and the coatable substrate 10. The birefringent coating layer 44 has two major surfaces 46 and 48. Inner major surface 46 is in contact with the coatable surface 12 of the coatable substrate 10. Outer major surface 48 is opposite of coating layer inner major surface 46, and is shown as being exposed in FIG. 5.

With continuing reference to FIG. 7, the birefringent coating layer is treated with an oxidizing agent (step 128). The birefringent coating layer 44, which is substantially non-polarizing in the visible spectral range, is transformed into a linear polarizer layer 50 having high polarization efficiency in the visible spectral range. At this step, iodine ions from iodide salts are activated in the presence of carbamide and an oxidizing agent. It has been found that ozone is effective as an oxidizing agent. For example, the birefringent coating layer is treated with ozone generated by an ozone generator or corona treater. Upon completion of the ozone treatment, coated substrate 52 functions as a linear polarizer 54. Steps 130 and 132 are optional steps for rendering the linear polarizer layer water-insoluble. At step 130, a passivation solution is prepared, and then coating layer is treated with the passivation solution (step 132). The passivation solution contains multi-valent cations. The multi-valent cations render the coating layer insoluble in water, by an ion exchange process. In this ion exchange process, monovalent ions of the birefringent aromatic polymers are exchanged for divalent or trivalent cations (multi-valent cations). In this case, examples of multi-valent cations are: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the coating layer would contain one or more of the aforementioned multi-valent cations. In preparing the passivation solution, multi-valent cations are obtained by dissolving certain salts and/or compounds in solution. Some examples of these salts or compounds are: $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$. At step 132, the coating layer is treated with the passivation solution. For example, step 132 may include dip-coating the coated substrate 32 in the passivation solution.

Figure 11:
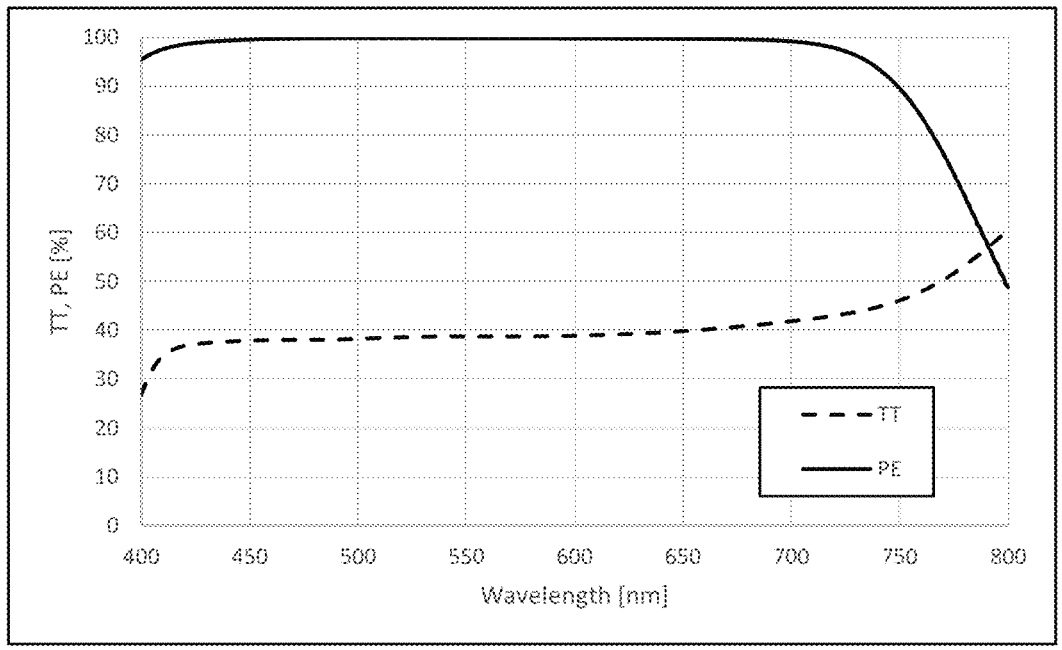
FIG. 11 is a graph of the wavelength dependence of the total transmittance (TT) and polarization efficiency (PE) of a linear polarizer layer, comprising a birefringent aromatic polymer of structure (A), according to the second embodiment.
Figure 12:
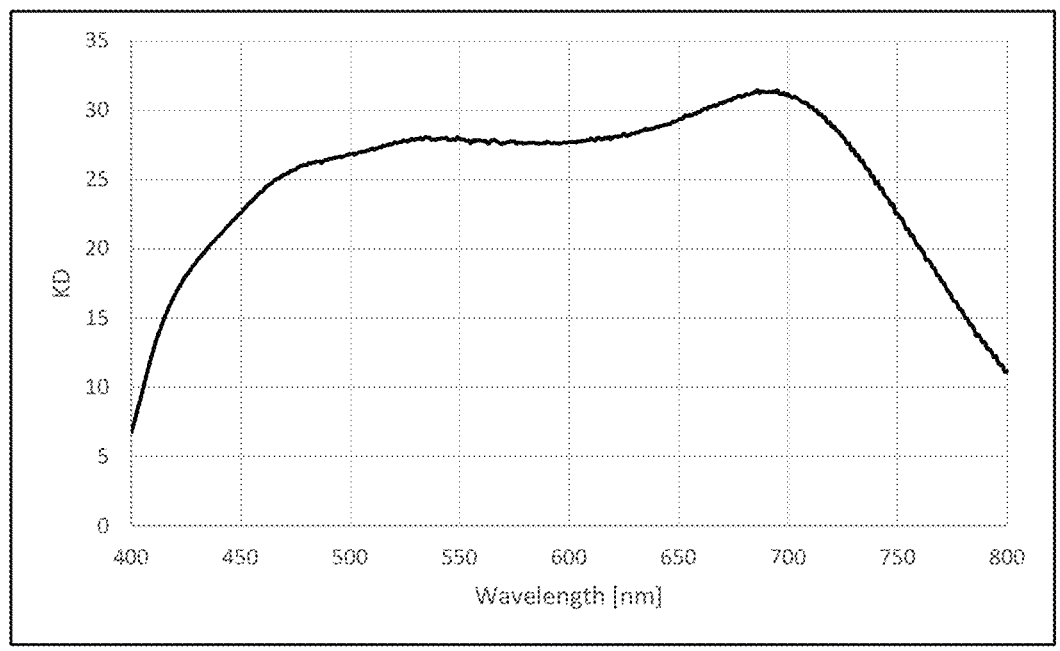
FIG. 12 is a graph of the wavelength dependence of the dichroic ratio (Kd) of a linear polarizer layer, comprising a birefringent aromatic polymer of structure (A), according to the second embodiment.

Optical properties of the linear polarizer layer 50 were measured for a linear polarizer layer according to the second embodiment, formed from a 1.5 µm thick, multi-component birefringent coating including the Example 1 Polymer and treated with ozone using a corona treater, according to details provided in Example 4 (Example 4 Sample). FIG. 11 is a graph of the wavelength dependence of the total transmittance (TT) and polarization efficiency (PE) of the Example 4 Sample. FIG. 12 is a graph of the wavelength dependence of the dichroic ratio (Kd) of the Example 4 Sample. At 550 nm, TT=38.76%, PE=99.79%, and Kd=27.90. Averaged over the spectral range of 400 nm-700 nm, TT=38.6%, PE=99.5%, and Kd=26.1. The maximum Kd, which occurs around 686 nm, is 31.43. A linear polarizer layer according to either of the embodiments can be used as a linear polarizer in a display such as a liquid crystal display.

A polymeric birefringent coating layer obtained using the Example 1 Polymer is substantially non-absorbing in the visible spectral range (400 nm-700 nm) (FIG. 8). As a result of the shear-coating, a polymeric birefringent coating layer exhibits in-plane optical retardation. A polymeric birefringent coating layer, that has not been treated as a doping-passivation solution, can be configured as an optical retarder. FIG. 14 is a top schematic view of an illustrative retarder layer 152. A polymeric lyotropic liquid crystal solution which contains a birefringent aromatic polymer has been shear-coated along an in-plane direction 154. As a result of the shear-coating, the birefringent aromatic polymer is generally aligned along direction 154. Direction 154 would be equivalent to direction 14 in FIG. 2. FIG. 14 shows two in-plane directions: direction 154, along which the refractive index at a certain wavelength in the visible wavelength range would be approximately maximum, and direction 156, orthogonal to direction 154, along which the refractive index at that certain wavelength would be approximately minimum. The refractive index at a wavelength along direction 154 is referred to as $n_x(\lambda)$, and the refractive index at the wavelength along direction 156 is referred to as $n_y(\lambda)$. The in-plane retardation $R_o(\lambda)$ is defined as $R_o(\lambda)=(n_x(\lambda)-n_y(\lambda))\cdot d$, where d is the thickness of the layer exhibiting in-plane retardation, namely the polymeric birefringent coating layer.

Figure 17:
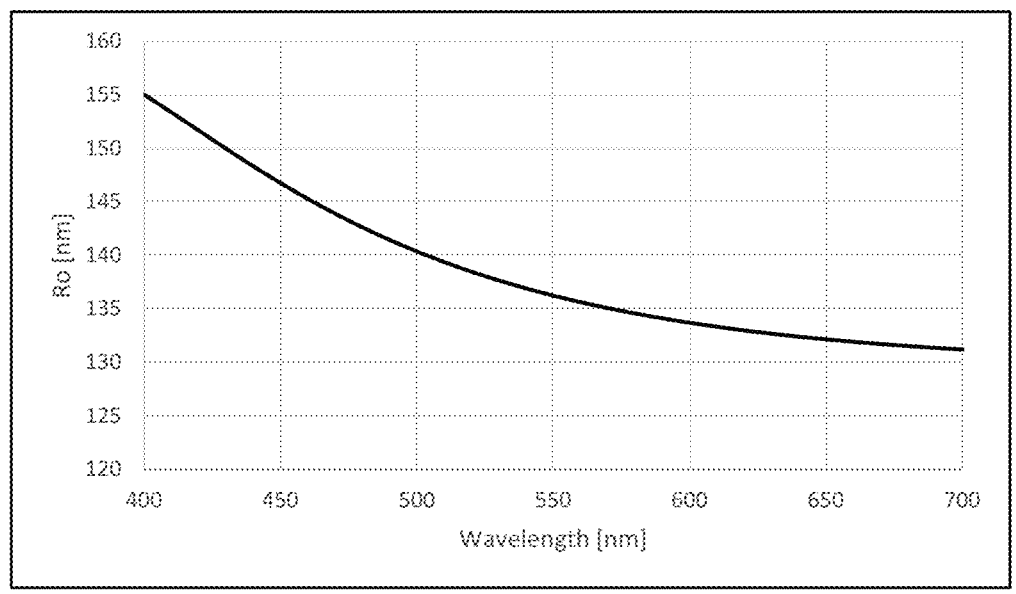
FIG. 17 is a graph of the wavelength dependence of the in-plane retardation of an illustrative retarder.

FIG. 17 is a graph of the wavelength dependence of the in-plane retardation $R_o(\lambda)$ of an illustrative retarder layer. The polymeric birefringent coating layer was formed by shear-coating a lyotropic liquid crystal solution containing the Example 1 polymer in aqueous solution, at a concentration of approximately 16 wt %. The thickness of the polymeric birefringent coating layer was approximately 750 nm. The retardation data were measured with a polarimeter Axometrics Axoscan. At a wavelength of 550 nm, the in-plane retardation shown in FIG. 17 is approximately 136.2 nm, which is approximately equal to the perfect quarter-wave retardation of 137.5 nm at a wavelength of 550 nm. For some applications described hereinbelow, an optical retarder can be considered to be a quarter-wave retarder if it exhibits an in-plane retardation in a range of 110 nm to 175 nm at wavelength of 550 nm, or more preferably in a range of 130 nm to 145 nm at a wavelength of 550 nm.

Figure 16:
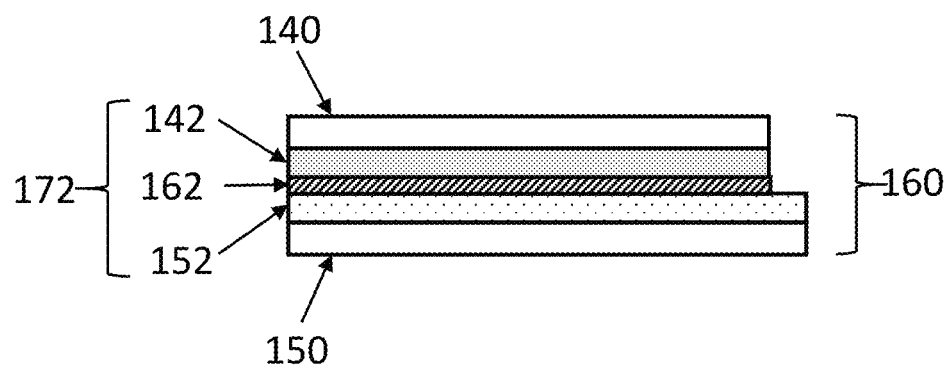

A circular polarizer can be formed from a suitable combination of linear polarizer layer and a quarter-wave retarder layer. FIGS. 15 and 16 are schematic top and side view of an illustrative optical article 160. Optical article 160 includes: a linear polarizer layer 142, a retarder layer 152, optionally a substrate 140 on which the linear polarizer layer 142 was formed, and optionally a substrate 150 on which the linear polarizer layer 152 was formed. As discussed, the linear polarizer layer is preferably 1.0 micrometers or less in thickness, and the retarder layer is preferably 1.0 micrometers or less in thickness. The retarder layer can be configured as a quarter-wave retarder, preferably exhibiting an in-plane retardation in a range of 110 nm to 175 nm at wavelength of 550 nm, or more preferably exhibiting an in-plane retardation in a range of 130 nm to 145 nm at a wavelength of 550 nm. Linear polarizer layer 142 and retarder layer 152 overlap to form a stack. The optical retarder layer 152 includes a first birefringent aromatic polymer generally aligned along a direction 154 (shear-coating direction of the first birefringent aromatic polymer), and the linear polarizer layer 142 includes a second birefringent aromatic polymer generally aligned along a direction 144 (shear-coating direction of the second birefringent aromatic polymer). In order to obtain a circular polarizer, the retarder layer 152 and the linear polarizer 142 are oriented relative to each other such that an angle 164 between the two alignment directions 154, 144 is in a range of 40° to 50°, and preferably in a range of 43° to 47°. In the case of an ideal quarter-wave retarder, the angle 164 would ideally be 45°.

The optical article 160 additionally includes an intermediate layer 162 interposed between the retarder layer 152 and the linear polarizer layer 142. The intermediate layer limits ion diffusion between the linear polarizer layer 142 and the optical retarder layer 152. The intermediate layer is preferably 100 μm in thickness or less. For example, the intermediate layer 162 acts as a barrier for the diffusion of iodine anions from the linear polarizer layer 142 to the optical retarder layer 152. Additionally, the intermediate layer 162 can include an adhesive, such as an acrylic optically clear adhesive (OCA). In this case, the intermediate layer can be used to laminate the linear polarizer (consisting of the linear polarizer layer 142 on substrate 140) and the retarder (consisting of the retarder layer 152 on substrate 150) together. The overlapped stack of the retarder layer 152, the linear polarizer layer 142, and the intermediate layer 162 interposed between them can be referred to as a circular polarizer 172 when the retarder is configured as a quarter-wave retarder and the retarder layer 152 and the linear polarizer 142 are oriented relative to each other at the angle 164 as described above.

Figure 18:
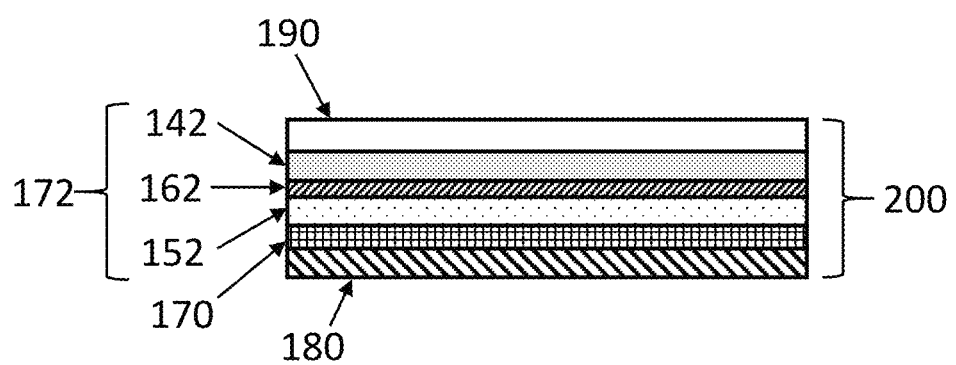
FIG. 18 is a schematic side view of another illustrative optical article.

FIG. 18 is a schematic side view of another illustrative optical article 200. Optical article 200 includes an overlapped stack of the following items, ordered by proximity to a viewer: an outer substrate 190 (closest to viewer), a linear polarizer layer 142, an intermediate layer 162 interposed between the linear polarizer layer 142 and the retarder 152, a retarder layer 152, a touch sensor layer 170, and an organic light-emitting diode (OLED) display panel 180 (farthest from viewer). The circular polarizer stack 172 consisting of the linear polarizer layer 142, intermediate layer 162, and the retarder layer 152, is as described above. OLED display panel 180 is configured to emit light toward the circular polarizer 172. A circular polarizer (172) positioned in front of the OLED display panel 180 can reduce reflection of ambient light (light entering from the ambient into optical article 200 through outer substrate 190 towards OLED display panel 180) from the OLED display panel 180 back toward the viewer. In the case of optical article 200, the retarder layer 152, the intermediate layer 162, and the linear polarizer 142, can be sequentially formed on top of an existing panel or substrate consisting of an OLED display and a touch sensor layer.

Birefringent Aromatic Polymer

The polymeric lyotropic liquid crystal solution or multi-component lyotropic liquid crystal solution includes a birefringent aromatic polymer. Birefringent aromatic polymers capable of forming a lyotropic liquid crystal in aqueous solution are used. The birefringent aromatic polymers can include, for example, copolymers and block copolymers. The concentration of the birefringent aromatic polymer in solution should be high enough that a liquid crystal phase is obtained. However, the concentration of the birefringent aromatic polymer should be low enough that the viscosity of the lyotropic liquid crystal solution is suitable for coating.

A birefringent aromatic polymer can be of a structure:

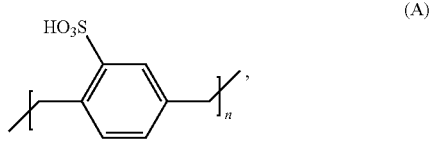

(A)

or an alkali metal, ammonium, or quaternary ammonium salt thereof, wherein the number (n) of segments of structure (A) in the birefringent aromatic polymer ranges from 25 to 10,000. This birefringent aromatic polymer of structure (A) is referred to as poly(monosulfo-p-xylene). Examples of alkali metals for alkali metal salts of structure (A) are Na, K, and Cs.

A birefringent aromatic polymer can be of a structure:

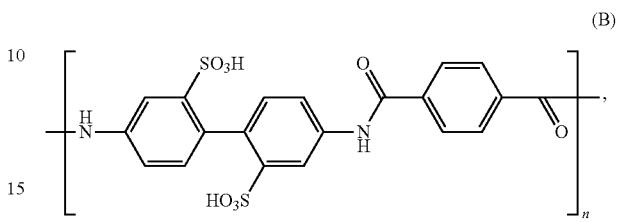

(B)

or an alkali metal, ammonium, or quaternary ammonium salt thereof, wherein the number (n) of segments of structure (B) in the aromatic polymer ranges from 20 to 20,000. This birefringent aromatic polymer of structure (B) is referred to as poly(2,2'-disulfo-4,4'-benzidine terephthalamide).

Doping-Passivation Solution

Both iodine and an iodide salt are needed in the doping-passivation solution of the First Embodiment. In the case of KI as the iodide salt, the weight ratio of KI to iodine ($I_2$) can range between 2:1 and 20:1. Example 3 shows the case where the weight ratio of KI:iodine:water is 10:1:100. If using $Sr^{2+}$ as the multi-valent cations, the cations can be obtained by dissolving $SrCl_2$ in water. Example 3 shows the case where the weight ratio of $SrCl_2$:water is 10:100. More generally, the weight ratio of $SrCl_2$:water can vary between 1:100 and 20:100. If using $Al^{3+}$ as the multi-valent cations, the cations can be obtained by dissolving $AlCl_3$ in water. The weight ratio of $AlCl_3$:water can vary between 1:100 and 20:100. Water can be used as the sole solvent of the doping-passivation solution. Other examples of possible solvents are: methanol, ethanol, propanol, butanol, acetone, methyl ethyl ketone, ethyl methyl ether, and diethyl ether. Alternatively, a mixture can be used as a solvent. For example, a water:ethanol mixture can be used as the solvent, with the water:ethanol ratio ranging between 50:50 and 100:0.

Multi-Component Lyotropic Liquid Crystal Solution

The multi-component lyotropic liquid crystal solution, of the second embodiment, contains carbamide, iodide salt, and a birefringent aromatic polymer. In the case of KI as the iodide salt and the Example 1 Polymer as the birefringent aromatic polymer, the weight ratio of KI:Example 1 Polymer can range between 1:2 and 1:10. Example 4 shows the case where the weight ratio of KI:Example 1 polymer is 1:5. Optionally, iodine ($I_2$) can be added to the multi-component lyotropic liquid crystal solution. In this case, the weight ratio of iodine ($I_2$):KI can range between 1:10 and 1:5.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials and solvents used in the following examples were purchased from commercial suppliers (such as Sigma-Aldrich Corporation, St. Louis, Mo.) and were used without further purification unless otherwise indicated.

Unless otherwise indicated, all percentages indicate weight per cents.

Example 1—Birefringent Aromatic Polymer of Structure (A)

In this Example 1, synthesis of a birefringent aromatic polymer of structure (A), sodium salt, or poly(monosulfo-p-xylene), sodium salt, is described. The reaction scheme is as follows:

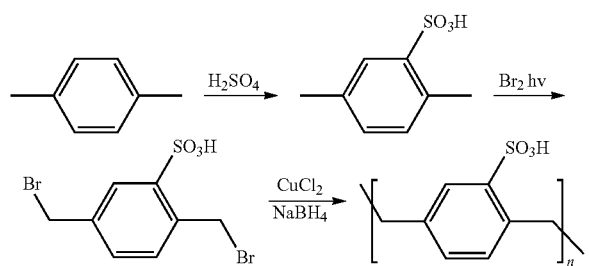

300 ml of sulfuric acid was added to 212 g of p-xylene at 90° C. The reaction mass was stirred at 90-100° C. for 30 min then cooled to 20-25° C. and poured into a beaker with 500 g of mixture of water and ice. The resulting suspension was separated by filtration and the filter cake rinsed with cool (5° C.) solution of 300 ml of hydrochloric acid in 150 ml of water.

The material was vacuum dried at 50 mbar and 50° C. for 24 hrs. Yield of 2,5-dimethylbenzene-sulfonic acid was 383 g (contained 15% water).

92.6 g of 2,5-dimethylbenzene-sulfonic acid was added to 1700 ml of chloroform and the mixture was purged with argon gas. Then it was heated to boiling with a 500 W lamp placed right against the reaction flask so that stirred contents of the flask was well lit. 41 ml bromine in 210 ml of chloroform was added dropwise within 4-5 hrs to the agitated boiling mixture. Once all bromine had been added the light exposure with refluxing continued for an extra hour. 900 ml of chloroform was distilled and the reaction mass was allowed to cool overnight. Precipitated material was isolated by filtration, the filter cake was rinsed with 100 ml of chloroform, squeezed and recrystallized from 80 ml of acetonitrile. Yield of 2,5-bis(bromomethyl)benzenesulfonic acid was 21 g.

4.0 g of sodium borohydride in 20 ml of water was added to a stirred mixture of 340 mg of $CuCl_2$, 10.0 g of 2,5-bis(bromomethyl)benzenesulfonic acid, 10.4 g of sodium bromide, 45 ml of amyl alcohol and 160 ml of degassed water and the reaction mass was agitated for 10 min. Then the mixture was transferred to a 1-liter reparatory funnel, 300 ml of water was added and after shaking the mixture was allowed to stand for an hour. The bottom layer was isolated, clarified by filtration and ultrafiltered using a polysulfone membrane with 10,000 molecular weight cut-off. Yield of birefringent aromatic polymer of structure A, Na salt is 4.0 g (on dry basis).

Example 2—Birefringent Aromatic Polymer of Structure (B)

In this Example 2, synthesis of a birefringent aromatic polymer of structure (B), sodium salt, or poly(2,2'-disulfo-4,4'-benzidine terephthalamide), sodium salt, is described. The reaction scheme is as follows:

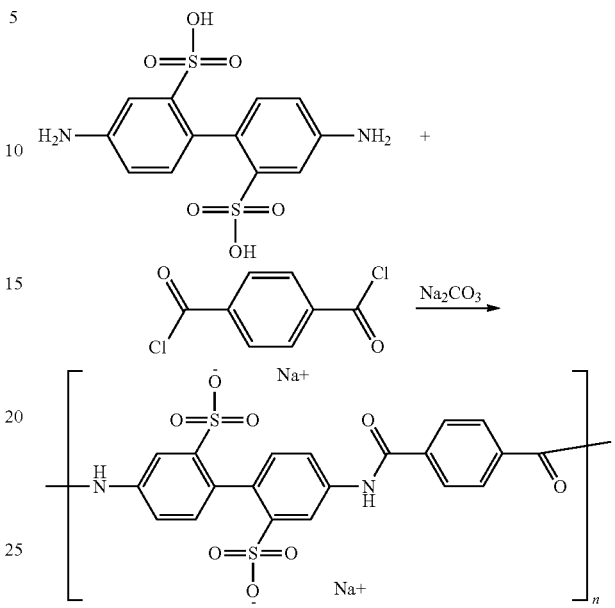

10.0 g (0.029 mol) of 4,4'-Diaminobiphenyl-2,2'-disulfonic acid was mixed with 3.1 g (0.029 mol) of Sodium Carbonate and 700 ml of water and stirred till dissolution. While stirring the obtained solution a solution of 6.5 g (0.032 mol) of Terephthaloyl Chloride in 700 ml of Toluene was added followed by a solution of 6.1 g of Sodium Carbonate in 100 g of water. The stirring was continued for 3 hours. Then the emulsion was heated to boiling and Toluene distilled out. The resulting water solution was ultrafiltered using PES membrane with MW cut-off 20K Dalton. Yield of the polymer was 180 g of 8% water solution.

Gel permeation chromatography (GPC) analysis of the sample was performed with Hewlett Packard 1260 chromatograph with diode array detector ($\lambda$=230 nm), using Varian GPC software Cirrus 3.2 and TOSOH Bioscience TSKgel G5000 $PW_{XL}$ column and 0.2 M phosphate buffer (pH=7) as the mobile phase. Poly(para-styrenesulfonic acid) sodium salt was used as GPC standard. The calculated number average molecular weight Mn, weight average molecular weight Mw, and polydispersity PD were found as $1.1 \times 10^5$, $4.6 \times 10^5$, and 4.2 respectively.

Example 3—Coated Sample Preparation and Measurements, First Embodiment

Details of the procedures for preparing coated samples according to the first embodiment are given in this Example 3. A TAC film (80 μm thick) is used as the coatable substrate. The coatable substrate is prepared by coating with a primer solution to improve adhesion of the coating. In this case, the primer solution is (3-Aminopropyl)trimethoxysilane, abbreviated APTMS, diluted to 1% in water. The primer solution is filtered through a 0.45 μm Nylon membrane filter before coating. The primer solution is coated on the coatable substrate using a Mayer rod #2. The designation #2 refers to the diameter of the wire on the Mayer rod in mils. The coatable substrate is then dried in an oven at 60° C. for 5 minutes, and is now ready for coating with the polymeric lyotropic liquid crystal solution.

A polymeric lyotropic liquid crystal solution is prepared by dissolving the Example 1 polymer in water at a concentration of 16%. The polymeric solution is coated on the coatable substrate using Mayer rod #4, and the resulting coated substrate is dried in an oven at 60° C. for 5 minutes. Thickness of the resulting polymeric birefringent coating layer is approximately 0.8 µm.

The doping-passivation solution is a solution containing doping and passivation constituents. The doping constituents are iodine ($I_2$) and iodide salts. In this case, the iodide salt is KI and the passivation constituent is $SrCl_2$. The doping-passivation solution is prepared as follows. Iodine (1 weight part) and KI (10 weight parts) are mixed and dissolved in 100 weight parts of water. The mixture is stirred for 10 minutes with no heating. The passivation constituent, $SrCl_2$ (10 weight parts), is added and mixed for 30 minutes with no heating.

The coated substrate is dipped in the doping-passivation solution for 90 seconds. The coated substrate is then dipped in a rinse solution for 3 seconds. In this case, the rinse solution is ethanol. Excess liquid is blown off of the coated substrate using compressed air. The coated substrate is dried in an oven at 60° C. for 5 minutes.

Optical measurements conducted on the Example 3 sample are reported in FIGS. 9 and 10.

Example 4—Coated Sample Preparation and Measurements, Second Embodiment

Details of the procedures for preparing coated samples according to the second embodiment are given in this Example 4. A multi-component lyotropic liquid crystal solution is prepared by dissolving carbamide (4 weight parts), KI (2.4 weight parts), and the Example 1 polymer (12 weight parts) in water (100 weight parts). A TAC film (80 µm thick) is used as the coatable substrate. The coatable substrate is prepared as in Example 3.

The multi-component lyotropic liquid crystal solution is coated on the coatable substrate using Mayer rod #8, and the resulting coated substrate is dried in an oven at 60° C. for 5 minutes. Thickness of the resulting multi-component birefringent coating layer is approximately 1.5 µm. The coated substrate is treated with a corona treater for 60 seconds.

Optical measurements conducted on the Example 4 sample are reported in FIGS. 11 and 12. The optical measurement results explained with reference to FIGS. 8-12 were performed using Shimadzu UV-2600 spectrophotometer equipped with a Glan polarizer in the signal beam. The spectrophotometer measured $T_{per}$ and $T_{para}$, and TT, PE, and Kd values were calculated therefrom.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

The disclosure relates to, a method of forming a linear polarizer, comprising the steps of: shear-coating a polymeric lyotropic liquid crystal solution comprising a birefringent aromatic polymer on a substrate to form a polymeric birefringent coating layer, the polymeric birefringent coating layer being 2.0 micrometers or less in thickness; and treating the polymeric birefringent coating layer with a doping-passivation solution comprising iodine anions and multi-valent cations to form a linear polarizer layer.

This method may additionally comprise the step of: removing excess doping-passivation solution from the linear polarizer layer. This method may additionally comprise the step of removing excess doping-passivation solution comprises treating the linear polarizer layer with a rinse solution. The rinse solution may comprises ethanol. Alternatively the step of removing excess doping-passivation solution comprises spin-drying the linear polarizer layer.

The method of any one or more of the preceding two paragraphs, wherein the doping-passivation solution additionally comprises cations selected from the group consisting of: $K^+$, $NH_4^+$, $Li^+$, $Na^+$, and $Cs^+$. T The method of one or more of the preceding three paragraphs, wherein the multi-valent cations are selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

The method of any one or more of the preceding four paragraphs, wherein the polymeric lyotropic liquid crystal solution is substantially free of poly(vinyl alcohol).

The method of any one or more of the preceding five paragraphs, wherein the birefringent aromatic polymer is of a structure:

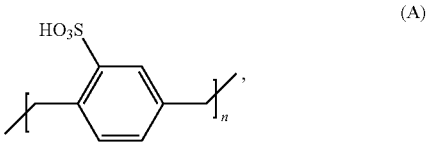

(A)

or a salt thereof, wherein n is an integer in a range from 25 to 10,000.

The method of any one or more of the preceding six paragraphs, wherein the birefringent aromatic polymer is of a structure:

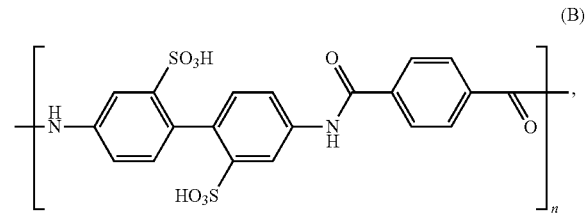

(B)

or a salt thereof, wherein n is an integer in a range from 20 to 20,000.

The method of any one or more of the preceding seven paragraphs, wherein the birefringent aromatic polymer comprises a group ($SO_3^- M^+$), and M is selected from the group consisting of Na, K, Cs, and $NH_4$.

The method of any one or more of the preceding eight paragraphs, wherein the polymeric lyotropic liquid crystal solution comprises water.

The method of any one or more of the preceding nine paragraphs, wherein the polymeric birefringent coating layer is 1.0 micrometers or less in thickness.

The method of any one or more of the preceding ten paragraphs, wherein the polymeric birefringent coating layer is substantially non-absorbing in the visible spectral range.

The method of any one or more of the preceding eleven paragraphs, wherein: the polymeric lyotropic liquid crystal solution comprises water; the birefringent aromatic polymer is a sodium salt of a structure:

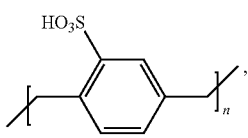

(A)

wherein n is an integer in a range from 25 to 10,000; the polymeric birefringent coating layer is 1.0 micrometers or less in thickness; the multi-valent cations are selected from $Sr^{2+}$ and $Al^{3+}$; and the doping-passivation solution additionally comprises $K^+$ cations.

The disclosure relates to, a linear polarizer, comprising: a polymeric birefringent coating layer of 2.0 micrometers or less in thickness, comprising a birefringent aromatic polymer, iodine anions, and multi-valent cations.

The linear polarizer of the preceding paragraph, wherein the multi-valent cations are selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

The linear polarizer of any one or more of the preceding two paragraphs, wherein the polymeric birefringent coating layer is substantially free of poly(vinyl alcohol).

The linear polarizer of any one or more of the preceding three paragraphs, wherein the birefringent aromatic polymer is of a structure:

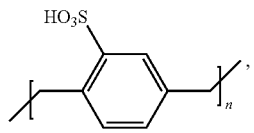

or a salt thereof, wherein n is an integer in a range from 25 to 10,000.

The linear polarizer of any one or more of the preceding four paragraphs, wherein the birefringent aromatic polymer is of a structure:

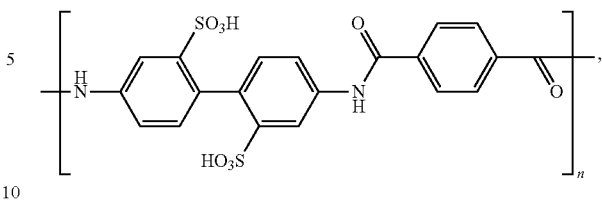

(B)

or a salt thereof, wherein n is an integer in a range from 20 to 20,000.

The linear polarizer of any one or more of the preceding five paragraphs, wherein the birefringent aromatic polymer comprises a group ($SO_3^-$).

The linear polarizer of any one or more of the preceding six paragraphs, wherein the birefringent aromatic polymer is capable of forming a lyotropic liquid crystal solution.

The linear polarizer of any one or more of the preceding seven paragraphs, wherein the polymeric birefringent coating layer is 1.0 micrometers or less in thickness.

The linear polarizer of any one or more of the preceding eight paragraphs, wherein the polymeric birefringent coating layer has a total transmittance, averaged over 400 nm to 700 nm, of 37% or greater, and a polarization efficiency, averaged over 400 nm to 700 nm, of 96% or greater.

The linear polarizer of any one or more of the preceding nine paragraphs, wherein the polymeric birefringent coating layer has a dichroic ratio, averaged over 400 nm to 700 nm, of 21 or greater.

The linear polarizer of any one or more of the preceding ten paragraphs, wherein: the birefringent aromatic polymer is a sodium salt of a structure:

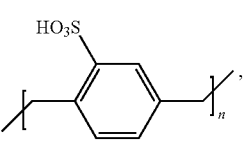

(A)

wherein n is an integer in a range from 25 to 10,000; and the multi-valent cations are selected from $Al^{3+}$ and $Sr^{2+}$.

A display comprising the linear polarizer of any one or more of the preceding eleven paragraphs.

A circular polarizer comprising the linear polarizer of any one or more of the preceding twelve paragraphs and a quarter-wave retarder.

A display comprising the circular polarizer of the preceding paragraph.

The disclosure relates to, an optical article, comprising: an optical retarder layer of 1.0 micrometers or less in thickness, comprising a first birefringent aromatic polymer, the first birefringent aromatic polymer being generally aligned along a first alignment direction; and a linear polarizer layer of 1.0 micrometers or less in thickness, comprising a second birefringent aromatic polymer, iodine anions, and multi-valent cations, the second birefringent aromatic polymer being generally aligned along a second alignment direction; an intermediate layer between the linear polarizer layer and the optical retarder layer to limit ion diffusion between the linear polarizer layer and the optical retarder layer; wherein an angle between the first alignment direction and the second alignment direction is in a range of 40° to 50°.

The optical article of the preceding paragraph, wherein the optical retarder layer has an in-plane retardation in a range of 110 nm to 175 nm at a wavelength of 550 nm. The in-plane retardation may be in a range of 130 nm to 145 nm at a wavelength of 550 nm.

The optical article of any one or more of the preceding two paragraphs, wherein the optical retarder is configured as a quarter-wave retarder.

The optical article of any one or more of the preceding three paragraphs, wherein the first birefringent aromatic polymer and the second birefringent aromatic polymer have identical structure.

The optical article of any one or more of the preceding four paragraphs, wherein the intermediate layer comprises an adhesive.

The optical article of any one or more of the preceding five paragraphs, additionally comprising a touch sensor layer, the optical retarder layer being positioned between the touch sensor layer and the linear polarizer layer.

The optical article of any one or more of the preceding six paragraphs, additionally comprising an organic light-emitting diode (OLED) panel, the optical retarder layer being positioned between the OLED panel and the linear polarizer layer.

What is claimed is:

1. A linear polarizer, comprising:
a polymeric birefringent coating layer of 1.0 micrometers or less in thickness, comprising a birefringent aromatic polymer, iodine anions, and multi-valent cations, wherein the birefringent aromatic polymer and iodine anions cooperate to polarize light incident on the birefringent aromatic polymer and iodine anions, and the birefringent aromatic polymer is of a structure:

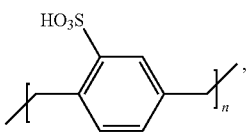

(A)

or a salt thereof,
wherein n is an integer in a range from 25 to 10,000, or the birefringent aromatic polymer is of a structure:

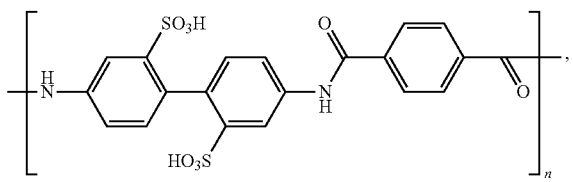

(B)

or a salt thereof,
wherein n is an integer in a range from 20 to 20,000.

2. The linear polarizer of claim 1, wherein the multi-valent cations are selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

3. The linear polarizer of claim 1, wherein the birefringent aromatic polymer comprises a group ($SO^{3-}$).

4. The linear polarizer of claim 1, wherein the polymeric birefringent coating layer has a total transmittance, averaged over 400 nm to 700 nm, of 37% or greater, and a polarization efficiency, averaged over 400 nm to 700 nm, of 96% or greater.

5. The linear polarizer of claim 1, wherein:
the birefringent aromatic polymer is a sodium salt of a structure:

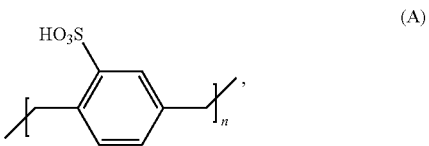

(A)

wherein n is an integer in a range from 25 to 10,000; and the multi-valent cations are selected from the group consisting of $Al^{3+}$ and $Sr^{2+}$.

6. A circular polarizer comprising the linear polarizer of claim 1 and a quarter-wave retarder.

7. An optical article, comprising: an optical retarder layer comprising a first birefringent aromatic polymer, the first birefringent aromatic polymer being aligned along a first alignment direction;

a linear polarizer layer of 1.0 micrometers or less in thickness, comprising a second birefringent aromatic polymer, iodine anions, and multi-valent cations, the second birefringent aromatic polymer being aligned along a second alignment direction, wherein the second birefringent aromatic polymer and iodine anions cooperate to polarize light incident on the second birefringent aromatic polymer and iodine anions, and the second birefringent aromatic polymer is of a structure:

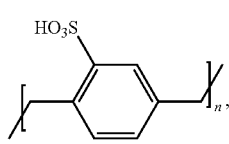

(A)

or a salt thereof,
wherein n is an integer in a range from 25 to 10,000, or the second birefringent aromatic polymer is of a structure:

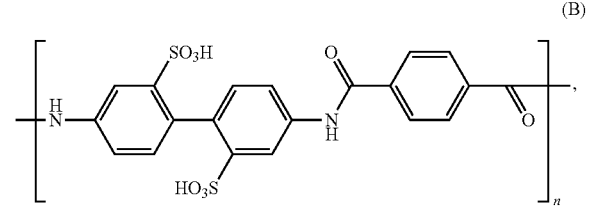

(B)

or a salt thereof, wherein n is an integer in a range from 20 to 20,000; and an intermediate layer between the linear polarizer layer and the optical retarder layer to limit ion diffusion between the linear polarizer layer and the optical retarder layer;

wherein an angle between the first alignment direction and the second alignment direction is in a range of 40° to 50°.

8. The optical article of claim 7, wherein the optical retarder layer has an in-plane retardation in a range of 110 nm to 175 nm at a wavelength of 550 nm.

9. The optical article of claim 7, wherein the intermediate layer comprises an adhesive.

10. The optical article of claim 7, additionally comprising a touch sensor layer, the optical retarder layer being positioned between the touch sensor layer and the linear polarizer layer.

11. The optical article of claim 7, additionally comprising an organic light-emitting diode (OLED) panel, the optical retarder layer being positioned between the OLED panel and the linear polarizer layer.

12. A method of forming a linear polarizer, comprising the steps of: shear-coating a polymeric lyotropic liquid crystal solution comprising a birefringent aromatic polymer on a substrate to form a polymeric birefringent coating layer, the polymeric birefringent coating layer being 1.0 micrometers or less in thickness; and treating the polymeric birefringent coating layer with a doping-passivation solution comprising iodine anions and multi-valent cations to form a linear polarizer layer, wherein the birefringent aromatic polymer is of a structure:

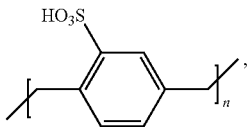
(A)

or a salt thereof, wherein n is an integer in a range from 25 to 10,000, or the birefringent aromatic polymer is of a structure:

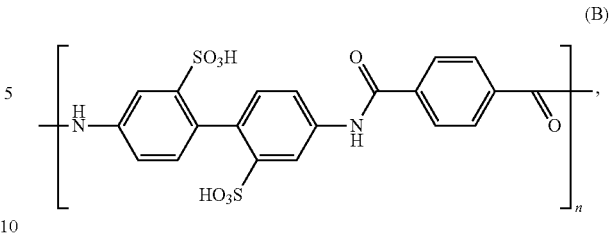
(B)

or a salt thereof, wherein n is an integer in a range from 20 to 20,000.

13. The method of claim 12, additionally comprising the step of:

removing excess doping-passivation solution from the linear polarizer layer.

14. The method of claim 13, wherein the step of removing excess doping-passivation solution comprises treating the linear polarizer layer with a rinse solution.

15. The method of claim 14, wherein the rinse solution comprises ethanol.

16. The method of claim 12, wherein the doping-passivation solution additionally comprises cations selected from the group consisting of: $K^+$, $NH_4^+$, $Li^+$, $Na^+$, and $Cs^+$.

17. The method of claim 12, wherein the multi-valent cations are selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

18. The method of claim 12, wherein:

the polymeric lyotropic liquid crystal solution comprises water;

the birefringent aromatic polymer is a sodium salt of a structure:

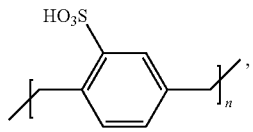
(A)

wherein n is an integer in a range from 25 to 10,000;

the multi-valent cations are selected from $Sr^{2+}$ and $Al^{3+}$; and the doping-passivation solution additionally comprises $K^+$ cations.

* * * * *